Feb. 3, 1931. H. H. SUHR 1,791,172

MOUSETRAP

Filed Feb. 18, 1930

Inventor

H. H. Suhr

By Clarence A. O'Brien
Attorney

Patented Feb. 3, 1931

1,791,172

UNITED STATES PATENT OFFICE

HENRY H. SUHR, OF PENDER, NEBRASKA

MOUSETRAP

Application filed February 18, 1930. Serial No. 429,244.

This invention relates to an improved trap such as is constructed for catching mice, rats, and analogous pests.

The invention has more particular reference to the type of trap which includes a base board, a spring actuated centrally located U-shaped impact frame carried by said board, a pivotally mounted retention and latch arm for holding the frame in a set position, and an animal actuated trip and bait holder which cooperates with the free end of the latch to hold it in frame-retaining position.

So far as I am aware, the animal actuated trip means in the ordinary trap releases the latch only when said trip means is swung up or down in a substantially vertically or perpendicular plane. Thus, it happens that animals are allowed to extract the bait from the trip means without actuating it by nibbling at the bait from the side and without moving the trip means downwardly.

The gist of the present invention is in the provision of animal actuated bait-holding trip means which may be actuated in a more sensitive manner because of a substantially universal movement. That is, the trip means may be actuated if it is moved either transversely of the base or up or down as the case may be.

My principal aim is to generally improve upon traps of this class by providing one which is more dependable, accurate and sensitive in action, and better equipped to fulfill the requirements of an article of this class in a more satisfactory manner, said results being attained through the medium of a structure which is quite as economical and simple as the ordinary mice traps.

Figure 1:
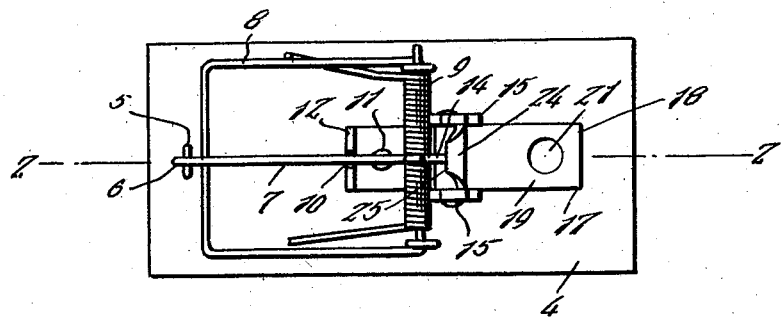
Figure 1 is a top plan view of a trap constructed in accordance with the present invention showing the same set for trapping.

I will first describe the old parts of the trap. The baseboard is indicated by the numeral 4 and is of usual construction. At one end is a staple 5 in which the eye 6 on the latch arm 7 is mounted. This affords the usual pivotal connection between the latch and the base. The U-shaped frame or impact element is indicated at 8 and this is rockably mounted on the intermediate portion of the base board and is actuated through the medium of the customary coiled spring 9.

As before stated, the novelty is in the animal actuated trip and bait holding means. This comprises two essential parts. The first part comprises a bracket 10 pivotally mounted as at 11 and provided with an upstanding finger 12 at one end. This finger is formed with a guide notch 13 in which the free end or central portion of the latch 7 is seated when the trap is set. Incidentally, the extremity 14 of the latch is of usual design and form.

The plate portion of the bracket 10 extends beneath the coiled spring so as to dispose the finger 12 on one side of the axis of the frame and to dispose the ears 15 on the opposite side of the pivotal mounting of the frame.

The numeral 16 designates a rocker pin or shaft carried by the ears 15. The animal actuated trip device is indicated generally by the numeral 17. It is formed from a single piece of metal which is bent upon itself as at 18 to form upper and lower spaced arm portions 19 and 20 respectively. Adjacent the bend 18 within the upper arm is a hole 21 which receives the bait (not shown). This exposes the bait through the open longitudinal edge portions between the arms 19 and 20 in an obvious manner.

Figure 3:
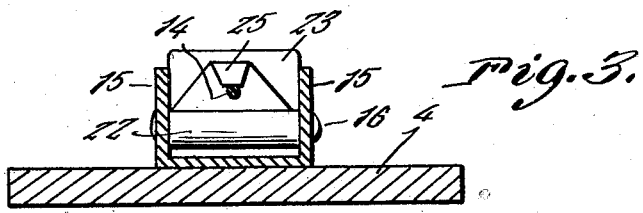
Figure 3 is a transverse vertical section on the line 3—3 of Figure 2.

The under arm 20 is bent around the shaft 16 to form a fulcrum as at 22 then forwardly and over the extremity of the arm 19 where it is directed upwardly as at 23 and horizontally at 24 and then bent down as at 25 to form what may be designated as a keeper. This keeper is of the truncated V shaped configuration shown in Figure 3 and the end portion 14 of the latch is engaged beneath the truncated extremity thereof.

Figure 2:
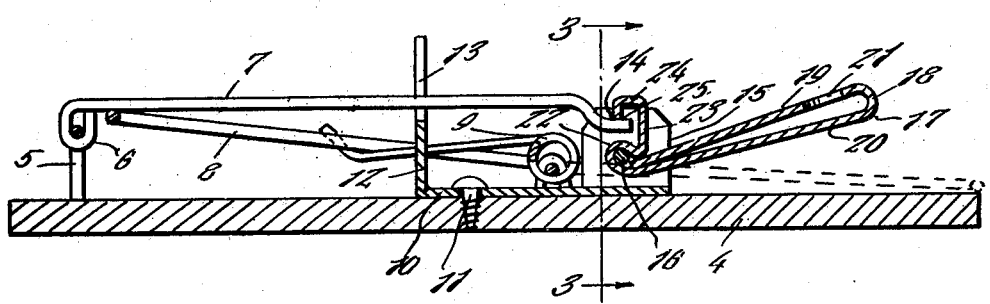
Figure 2 is a longitudinal section on the line 2—2 of Figure 1.

The trap is set and baited in the usual way and when in condition for operation, the parts assume the relationship shown in Figures 1 and 2. If in the course of attempting to remove the bait from the holder, the animal pushes against either longitudinal side thereof, it is obvious that the holder together with the pivoted bracket 10 will swing as a unit around the pivot 11. This does two things. Inasmuch as the end portion of the latch 7 is seated in the notch 13, it is obvious that the latch is moved sidewise in a direction opposite to the thrust or movement of the bracket. This tends to readily disengage the ends 14 from the keeper 25. In addition, the freedom of motion of the part 17 itself aids in this quick release. Consequently, the trap will be expeditiously released to function in the usual way; that is, the frame 8 will swung over to the dotted line position shown in Figure 2 to strike the animal.

Particularly do I wish to emphasize the fact that this sort of trip means is practically universal in action since the part 17 will operate either laterally in two directions or upwardly or down. If it is swung upwardly and pushed slightly to the side, this will disengage the latch. If it is swung down, this will clear the latch and also disengage it. Consequently, this is believed to be a practical and feasible releasing means which is far more sensitive and dependable than the usual type of mechanism employed.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice if desired.

I claim:

1. In a trap of the class described, a base, a U-shaped impact frame rockably mounted thereon and including spring actuating means, a releasing latch mounted on the base and cooperable with the frame, a bracket pivotally mounted on said base and including an upstanding notched finger for reception of the intermediate portion of the latch, the forward end of said bracket extending beneath and forwardly of the pivotal mounting of said frame, and a bait holder mounted on said bracket and including a keeper cooperable with the extremity of said latch.

2. In a trap of the class described, a base, a horizontal transversely disposed pivot pin mounted on the base, a substantially U-shaped frame having its arm portions mounted on said pivot pin, a spring on the pivot pin and connected with the frame for actuating said frame, a pivotally mounted latch adapted to overlie the frame and to extend beyond the pivot pin, a bracket comprising a plate seated on the central portion of the base and extending beneath said pivot pin, a pivot mounting said bracket on said base, said bracket including an upstanding notched finger adjacent the pivot pin, said notch serving to accommodate the intermediate portion of the latch, the forwardly extending end portion of the bracket being provided with upstanding ears, a shaft carried by said ears and disposed in a horizontal plane, and a bait holder rockably mounted on said shaft and including a keeper cooperable with the extremity of the latch, the bait holder and bracket being movable laterally as a unit, and said bait holder having vertical movement independent of the bracket.

3. As a new product of manufacture, a bracket for use with a mouse trap of the class described comprising a plate having a pivot hole formed therein adjacent one end, a pivot screw for reception in said hole and adapted to be embedded in the base of a trap, said bracket including an upstanding notched finger at one end, said bracket having spaced parallel ears at the opposite end, and a rock-shaft disposed between said ears.

4. As a new product of manufacture, a bracket for use with a mouse trap of the class described comprising a plate having a pivot hole formed therein adjacent one end, a pivot screw for reception in said hole and adapted to be embedded in the base of a trap, said bracket including an upstanding notched finger at one end, and having spaced parallel ears at the opposite end, a rock-shaft disposed between said ears, and a bait holder including a fulcrum rockably mounted on said rock shaft, said bait holder also including a latch keeper.

5. As a new product of manufacture, a bait holder for use with a bracket of the class described comprising a single strip of metal bent between its ends to provide upper and lower arms, the end portion of the lower arm extending beyond the adjacent end of the upper arm and being formed into a fulcrum, then extending upwardly in a vertical direction, then horizontally, and terminating in a depending truncated keeper, the upper arm being formed with a bait hole adjacent the bend in said strip.

In testimony whereof I affix my signature.

HENRY H. SUHR.